(12) United States Patent
Berwanger et al.

(10) Patent No.: US 9,334,969 B2
(45) Date of Patent: May 10, 2016

(54) PINCH VALVE

(75) Inventors: Johannes Berwanger, Esslingen (DE); Martin Herrig, Dettingen (DE)

(73) Assignee: FESTO AG & CO. KG, Esslingen (DE)

(*) Notice: Subject to any disclaimer, the term of this patent is extended or adjusted under 35 U.S.C. 154(b) by 252 days.

(21) Appl. No.: 14/008,166

(22) PCT Filed: Mar. 28, 2012

(86) PCT No.: PCT/EP2012/001344
§ 371 (c)(1),
(2), (4) Date: Sep. 27, 2013

(87) PCT Pub. No.: WO2012/130435
PCT Pub. Date: Oct. 4, 2012

(65) Prior Publication Data
US 2014/0077107 A1 Mar. 20, 2014

(30) Foreign Application Priority Data
Mar. 29, 2011 (DE) .......................... 10 2011 015 385

(51) Int. Cl.
*F16K 7/04* (2006.01)
*F16K 7/06* (2006.01)

(52) U.S. Cl.
CPC .. *F16K 7/04* (2013.01); *F16K 7/065* (2013.01)

(58) Field of Classification Search
CPC ............ F16K 7/04; F16K 7/065; F16K 7/061
USPC .................................................... 251/4, 7, 8
See application file for complete search history.

(56) References Cited

U.S. PATENT DOCUMENTS

| 1,865,012 | A | * | 6/1932 | Jackson | .......................... 366/11 |
| 2,987,292 | A | | 6/1961 | Teson et al. | |
| 3,550,861 | A | * | 12/1970 | Teson | ............................ 239/546 |
| 3,685,786 | A | | 8/1972 | Woodson | |
| 3,920,215 | A | | 11/1975 | Knauf | |
| 7,360,555 | B2 | * | 4/2008 | Bruhat et al. | ................. 137/460 |

FOREIGN PATENT DOCUMENTS

| DE | 69232487 | | 4/1993 | |
| DE | 102007006764 B3 | * | 4/2008 | ............... F16K 7/04 |
| EP | 1148281 | | 10/2001 | |
| EP | 1148281 A1 | * | 10/2001 | ........ A61M 39/0613 |

OTHER PUBLICATIONS

Translation for DE 102007006764 B3 Aug. 5, 2015.*

* cited by examiner

*Primary Examiner* — John K Fristoe, Jr.
*Assistant Examiner* — Paul Gray
(74) *Attorney, Agent, or Firm* — Hoffmann & Baron, LLP

(57) ABSTRACT

Proposed is a pinch valve (1) which has a hose-like valve element (3), an actuating element (18) arranged on the outer circumference of the valve element (3), and at least one radially movable plunger (33a, 33b) arranged between the actuating element (18) and the valve element (3). On the inner side (39) of the actuating element (18) there is situated at least one actuating surface, which extends in the circumferential direction and at the same time axially and which bears against a plunger (33a, 33b). By way of guide means (28a, 28b), it is ensured that, in the event of rotation of the actuating element (18), the actuating surface slides on the at least one plunger (33a, 33b) and pushes the latter radially inward, because the spacing of the actuating surface to the valve element (3) varies over the longitudinal profile thereof.

16 Claims, 7 Drawing Sheets

PINCH VALVE

This application claims priority based on an International Application filed under the Patent Cooperation Treaty, PCT/EP2012/001343, filed Mar. 28, 2012, which claims priority to DE102011015385.3, filed Mar. 29, 2011.

BACKGROUND OF THE INVENTION

The invention relates to a pinch valve with a hose-like valve element having a longitudinal axis, and an actuating element that is disposed on the outer circumference of the valve element and that is rotatable, executing an actuating movement, relative to the valve element in the circumferential direction thereof, and, in addition, having at least one plunger, which while executing an operating movement can be optionally moved toward the inside in the direction of the valve element or, to the opposite, toward the outside, transversely relative to the longitudinal axis of the valve element for the purpose of pinching the valve element more or less intensely and which is disposed between the valve element and the actuating element, and wherein the actuating element at the inner side thereof that is directed toward the valve element includes at least one actuating surface serving for a pressing application of force to the at least one plunger and sliding off the at least one plunger when executing the actuating movement, wherein the actuating surface has a longitudinal profile extending at least in part in the circumferential direction of the valve element with a changing spacing in relation to the valve element.

A pinch valve of this kind is disclosed in U.S. Pat. No. 3,920,215 and contains a longitudinal, hose-like valve element that is surrounded by a housing-type enveloping body and extends between two fluid connections. Disposed coaxially on the enveloping body is an axially immovably fixed actuating element that is, however, rotatable relative to the valve element in the circumferential direction thereof. The enveloping body is radially slotted and interspersed by two radially displaceable plungers that rest, on the one hand, on the outer circumference of the valve element and, on the other hand, on an actuating surface that is configured on the inner side of the actuating element. The actuating surface has a longitudinal profile that is oriented relative to the circumferential direction of the valve element, wherein the radial spacing thereof relative to the valve element is changing over the length thereof. In other words, the course that the actuating surface takes corresponds to the profile of a longitudinal section of a spiral that is disposed at a right angle relative to the valve element. When the actuating element is rotated relative to the enveloping body, and thereby also relative to the valve element, the spiral-like actuating surface slides off the rear of the plunger allocated thereto and presses the same, to a more or lesser degree, radially to the inside.

A disadvantage of the pinch valve that is known from the prior art is the fact that there is a relatively large gear ratio between the rotational movement of the actuating element that functions as the actuating movement and the operating movement of each actuating element that is derived therefrom. Correspondingly, there results a high actuating force. Moreover, intermediate positions of the plunger can only be guaranteed by means of latching steps, which are instrumental in causing impairments, as they result in a certain heaviness of the actuating movement, do not allow for a stepless adjustment of the desired cross-section of flow and are ultimately subject to a relatively high wear and tear.

DE 69232487 T2 discloses a valve closure that operates in the manner of a pinch valve in that it provides that a hose can be locked by means of a radially movable compression element, for example a ball, in that a cam applies force to the compression element; and the cam is configured on the internal surface of a tube-shaped housing part, and a housing part that receives the hose can be screwed onto the same.

U.S. Pat. No. 2,987,292 discloses a pinch valve with a hose that can be pinched by radially movable balls, which can be actuated by means of a rotatable disc. The disc features curved actuating surfaces on the internal circumference thereof for applying force to the balls.

SUMMARY OF THE INVENTION

Therefore, it is the object of the present invention to provide a pinch valve that allows for an easy actuating movement of the actuating element, which can be finely dosed.

To achieve this object, it is envisioned, in conjunction with the characteristics as mentioned in the introduction, that the longitudinal profile of the at least one actuation surface includes at least partially an axial component in the axial direction of the longitudinal axis of the valve element that is superimposed over the circumferential direction of the valve element, wherein the actuating movement of the actuating element is a combination of a rotational movement and a related, at least phase-wise superimposed axial displacement movement, such combination of movement being defined by guide means.

Especially expedient in this context is a related construction that provides that the longitudinal profile of the actuating surface is continually composed of components that are superimposed relative to each other in the circumferential direction and the longitudinal direction of the valve element. This results, in particular, in a helical longitudinal profile of the actuating surface.

Due to the longitudinal profile according to the invention of the at least one actuating surface and due to the associated circumstance whereby the actuating movement is, due to the available guide means, a corresponding combination of a rotational movement and a, related thereto, at least in part superimposed axial displacement movement, it is possible to implement, if necessary, a very easy actuating movement that can be finely dosed. Compared to the prior art, with a comparable operating stroke of the at least one plunger, it is possible to coordinate herein a longer section of the actuating surface with the plunger to generate the operating movement of said plunger. Correspondingly, the radial spacing variation between the actuating surface and the valve element can be spread further apart and distributed over a greater rotational movement and/or a greater angle of rotation of the actuating element, thereby resulting in a smaller gear ratio, such that the adjustment forces required for actuating the actuating element can be maintained at a low level. This way, there also exists the possibility, in particular, of restricting the actuating surface over the longitudinal profile thereof to such a moderate degree that, even without steps to achieve a form closure, a self-inhibition is present based on the frictional closure alone, with the consequence that the actuating element stably maintains any adjustment position independently of the prevailing fluid pressure and without additional auxiliary forces and/or a catch.

By the measure according to the invention, it is also possible to achieve a tapering of the actuating surface in such a way that the performance characteristic of the throughflow of the flow medium that is controlled by the pinch valve is linearized. Correspondingly, it is possible to achieve especially precise and reproducible dosing of the throughflow.

Advantageous improvements of the invention are captioned in the dependent claims.

Expediently, the actuating surface that cooperates with a respective plunger is formed by the delimiting surface of an at least in part non-linear groove that is disposed on the inner side of the actuating element and into which the allocated plunger protrudes by an actuating section thereof intended to apply force to the actuating section in order to generate the operating movement. In particular, the actuating section, which protrudes into the groove, is an end section of the plunger that is oriented opposite to the valve element. The delimiting surface is preferably a base area of the groove that has adjacent thereto, on both sides, flanks of the groove that is able to act, in relation to the longitudinal axis of the valve element, in a radial direction from axially outside on the related plunger.

Expediently, the actuation section of the plunger that engages in the groove has a tapered configuration, such that, even when the actuating surface is spread wide in the longitudinal direction of the valve element, there is no jamming risk between the plunger and the flanks of the groove. To implement the changing spacing with regard to the longitudinal direction of the groove, it is expedient for the depth of the groove to be changing in the longitudinal direction of the groove, specifically over at least a part of the length of the groove, preferably over the entire length of the groove.

The guide means can be configured independently of the at least one plunger. However, the structural form that provides for the at least one plunger to be one of the guide means and that contributes itself directly by being a guide means to the fact that the actuating movement is a superimposed rotational and displacement movement of the actuating element that follows the longitudinal profile of the actuating surface is particularly preferred. In this context, it is advantageous for the at least one plunger and the delimiting surface of the allocated groove together to constitute the guide means, wherein the plunger plunges into the groove and has force applied thereto by the flanks of the groove, such that the actuating element is caused to perform the special actuating movement thereof, due to the interaction of the grooves and plunger that engage with each other, when the corresponding actuation and/or displacement forces are applied to the actuation element from the outside. The actuation movement can be generated, in particular, by applying a torque to the actuating element.

As indicated previously, it is advantageous when the longitudinal profile of at least one actuating surface is at least partially helical.

As a matter of principle, the pinch valve can be provided with only a single movable plunger that acts on the valve element from one side, such that the pinch valve can be pinched between the movable plunger and a stationary counter-surface. Presumably, however, it is more advantageous for the valve element to include a plurality of individual plungers that are distributed in the circumferential direction around the valve element. This way, it is possible to reduce the stroke of the individual plungers that is necessary to optionally completely release or close off the cross-section of flow.

A dual arrangement of plungers is considered particularly expedient, where it is envisioned to dispose two plungers on two diametrically opposed sides of the outer circumference of the valve element. To close the valve element, when executing the actuation movement, both plungers are simultaneously pressed, coming from two opposite sides, in the radial direction toward the inside and against the outer surface of the wall of the valve element.

The pinch valve can be configured such that a plurality of plungers cooperates with the same actuating surface, respectively, wherein only the places of the instantaneous cooperation in the longitudinal direction of the actuating surface are spaced relative to each other. In such a case, it is typically possible, however, to implement the actuating surface as having only a very minimal incline, when the plungers are to be disposed in the axial direction of the valve element at the same height lying opposite each other. Or, in the alternative, special molding steps for the movable plunger are needed. Simpler means, which translates into cheaper means, that must therefore be preferred involve, as a matter of fact, a structural form having at least two of the available plurality of plungers with different actuating surfaces, meaning they cooperate with one own actuating surface thereof, respectively. Each plunger that is present expediently cooperates with one own actuating surface thereof. If the pinch valve is provided with two plungers, the actuating element thus carries two actuating surfaces.

All the actuating surfaces of one and the same actuating element are expediently distributed in the circumferential direction of the valve element, offset relative to each other on the actuation element, wherein this circumferential offset is, in particular, 180°. Among themselves, the plurality of actuating surfaces have an identical longitudinal profile. Moreover, they are preferably disposed at the same height in the longitudinal direction of the valve element.

An especially advantageous configuration of the pinch valve provides for a plurality of non-linear grooves that are disposed on the inner side of the actuating element in the manner of a multiple-start thread, in which engages one of the plurality, respectively, of the plungers, which are distributed along the outer circumference of the valve element and disposed at the same axial height thereof in relation to the longitudinal profile of the valve element, and wherein each groove functions both as an actuating surface and as a guide means.

Expediently, the actuating element is configured as sleeve-like and disposed in such a manner that it coaxially encloses the valve element. It can be configured as longer or shorter than the valve element.

Expediently, the pinch valve has an enveloping body that encloses the valve element in a concentric fashion, and the sleeve-like actuating element is preferably disposed, rotatably and axially displaceably, on the outer circumference thereof. The enveloping body can also directly constitute a housing of the pinch valve. Furthermore, the enveloping body comprises a number of radial passages that expediently matches the number of available plungers, and which are interspersed in a radially displaceable manner, respectively, by at least one plunger for executing the operating movement thereof.

The enveloping body can be configured in one piece or in multiple pieces. Preferably, said body is made up of two shell-like support elements that are placed, coming from diametrically opposed sides, to the outside on the valve element, and further of an external tube that coaxially encloses the shell-like support elements from the outside. Each passage therein intersperses at least one support element as well as the external tube.

Expediently, the external tube is connected, by a form closure by means of rolling or by means of another shaping method, to the end elements on the frontal side that define a fluid connection, which respectively communicates with a valve channel that intersperses the valve element.

The enveloping body is preferably configured as smooth, such that reliable and easy guiding action is achieved for the actuating element that must be moved in a combination-type rotational and axially displacing manner.

It is possible to dispose an indicator scale on the outside surface of the enveloping body that extends in the longitudinal direction of the valve element, which is axially covered up at varying widths by the actuating element as a function of the adjustment position thereof. This way, it is possible to take an easy reading of the currently adjusted value of the released flow cross-section.

The actuating element can be configured, in particular, for the manual or machine-type introduction of an actuating force that generates the actuation movement. Similarly, it is possible to envision a configuration that allows for optionally introducing manual or machine-type actuating forces. For the machine-type introduction of the actuating force, the pinch valve is expediently equipped with an electric drive motor that is coupled to the actuating element in such a manner that it is able to power the same. The coupling can be achieved, for example, by means of a gear train. The actuating element therein can include, directly on the outer circumference thereof, a gear-type toothing that meshes with a drive gear that can be powered by a drive motor. With a machine-type and/or motor-type drive means powering the actuating element, it is possible to detect the degree of release of the cross-section of flow of the valve element, particularly by means of a displacement measuring system. For example, it is possible to detect the current operating state of the pinch valve by means of the rotary movement of a drive motor, whereby no position-detecting means involving the actuating element is necessary.

The pinch valve according to the invention also opens up the possibility of gradually adjusting the actuating element, bringing the same in the respectively desired position in a stepless manner. Although the actuating movement of the actuating element is composed of a rotational movement and a superimposed axial displacement movement that is related thereto, the actuating force can preferably be introduced into the actuating element exclusively as a torque. The axial movement component of the actuating movement results from the at least one guide means that accommodates the at least one actuating surface.

BRIEF DESCRIPTION OF THE DRAWINGS

The invention will be described in further detail below based of the enclosed drawings. Shown are as follows.

DETAILED DESCRIPTION OF THE PREFERRED EMBODIMENTS

Figure 1:
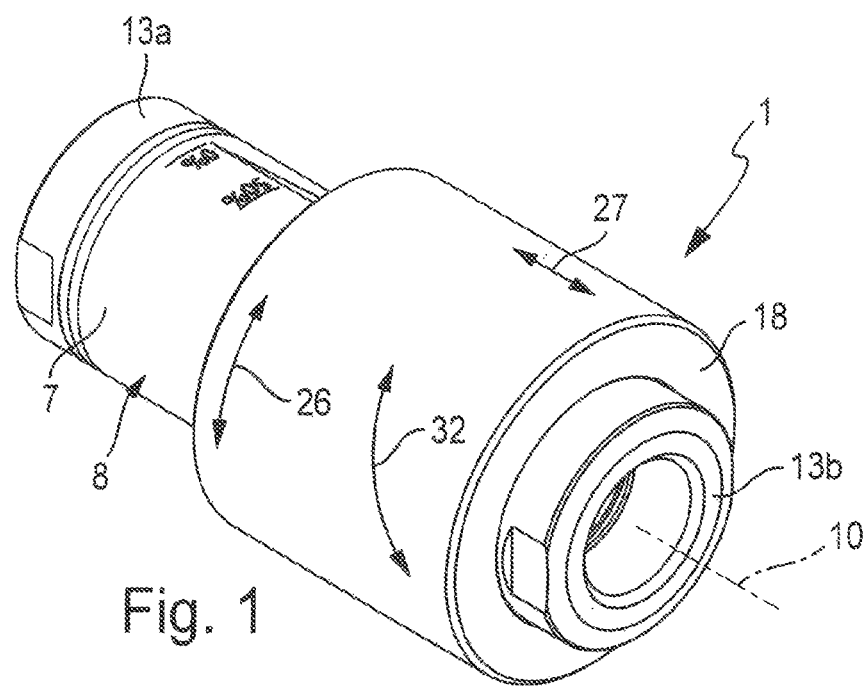
FIG. 1 depicts a perspective exterior view of a preferred embodied example of the pinch valve according to the invention in the maximum open position thereof.
Figure 2:
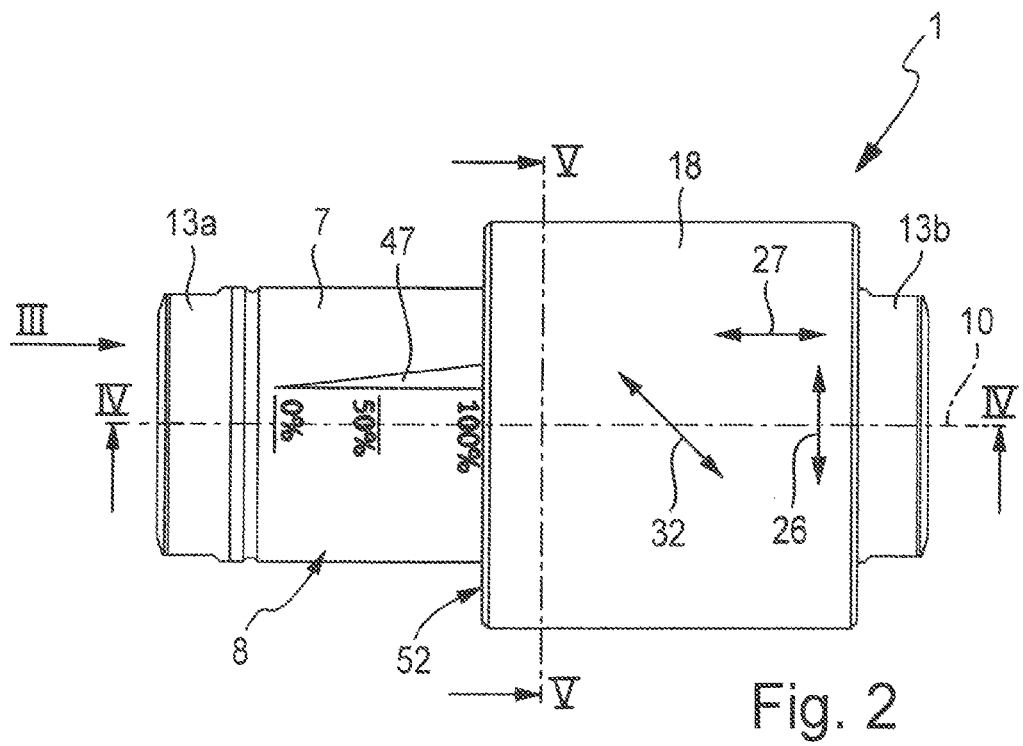
FIG. 2 depicts a side view of the pinch valve from FIG. 1.
Figure 3:
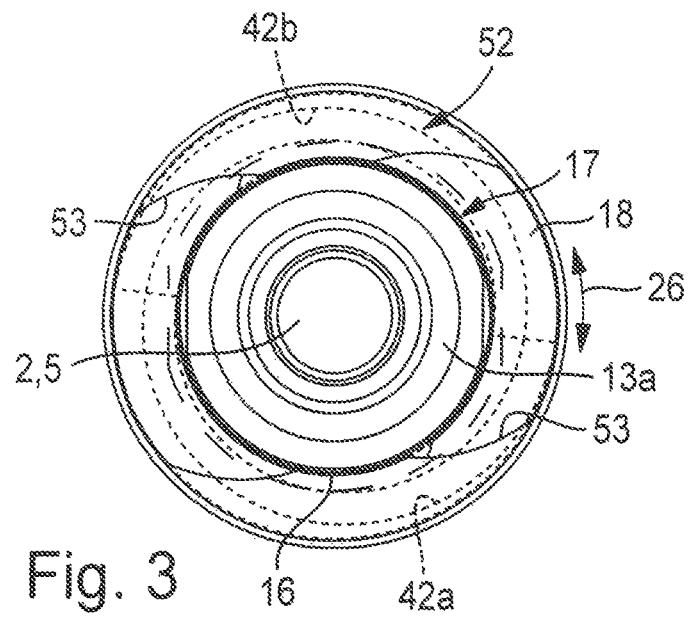
FIG. 3 depicts a front view of the pinch valve, with a view according to arrow III from FIG. 2.
Figure 5:
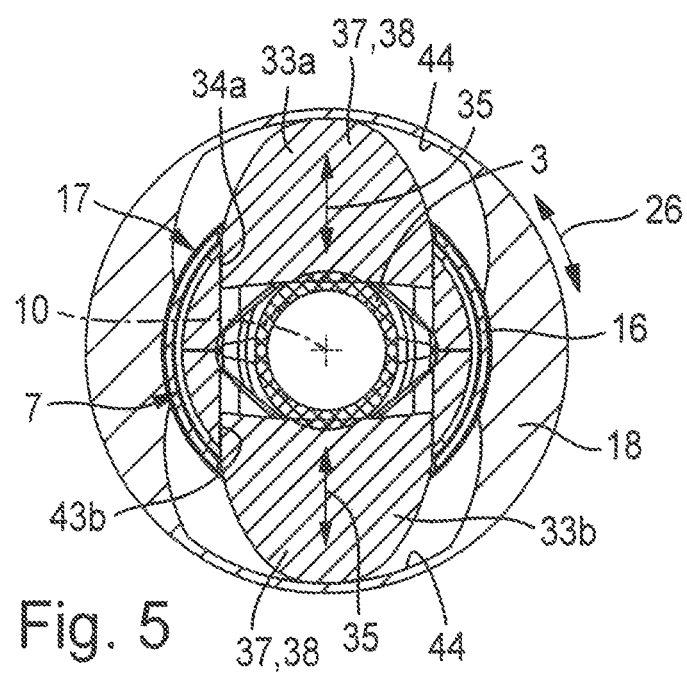
FIG. 5 depicts a cross-section of the pinch valve in the maximum open position, along a sectional line V-V from FIGS. 2 and 4.

The pinch valve as a whole is designated by the reference numeral 1 and configured such that it is able to variably prescribe the cross-section of flow that is available for a flow medium when said medium flows through a valve channel 2.

In this regard, the pinch valve 1 of the embodiment is able to provide a closed position in which any flow is completely prevented from passing through (FIGS. 7 to 10), an open position in which the flow cross-section is maximally wide (FIGS. 1 to 6) and any—particularly gradual-intermediate position between the open position and the closed position, where the cross-section of flow is between zero and the maximum available cross-section.

A flow medium that must be controlled is typically a gas or a liquid. However, the pinch valve 1 is also able to influence the flow rate of other fluid media, wherein particularly powder- or granulate-type materials are considered therein.

The pinch valve 1 has a hose-like valve element 3 with a longitudinal axis 10 and extending, preferably, over a linear extension. Said valve element 3 has two end sections 4a, 4b that are axially disposed opposite of each other and interspersed by a valve element channel 5 delimiting the same, which opens at the frontal side on the two end sections 4a, 4b.

The wall area of the valve element 3 is radially flexible with regard to the longitudinal axis; particularly, it is elastically deformable. This deformability relates particularly to a control area 6 that is disposed at a distance relative to one of the two end sections 4a, 4b, and which is disposed in an axial central position between the two end sections 4a, 4b. Preferably, however, the totality of the valve element 3 has rubber-elastic properties throughout.

In the neutral state, which is when no radial force is applied from the outside, the valve element has a configuration wherein the channel of the valve element 5 is continuously open, thus releasing the maximum possible cross-section for accommodating the flow.

Expediently, the hose-like valve element 3 is coaxially enclosed by a rigid enveloping body 7. By way of an example, this enveloping body 7 is a component of a housing 8 of the pinch valve 1 that encloses the valve element 3. In the non-deformed, neutral state of the valve element 3, the enveloping body 7 rests against the radially outwardly oriented outer circumference 12 of the valve element 3, and it prevents inflation of the valve element 3, when atmospheric excess pressure is present in the channel of the valve element 5.

Following each of the preferably flange-like configured end sections 4a, 4b is, expediently, one of two close-off elements 13a, 13b that are expediently also part of the housing 8 that define each a fluid connection 14a, 14b. The fluid connection 14a, 14b is characterized by a fluid channel that intersperses the related connection element 13a, 13b with allocated connection means 15 that allow for connecting a continuing fluid line, particularly in a detachable manner. By way of an example, the connection means 15 are constituted of a thread; however, a plug and socket connection, for example, is possible as well.

The valve element 3 rests against the respectively following close-off element 13a, 13b by the circularly shaped contoured end sections 4a, 4b, axially sealing the same. This way, there results a fluid-proof transition between the channel of the valve element 5 and each fluid connection 14a, 14b, wherein the channel of the valve element 5 defines the valve channel 2 of the pinch valve 1 together with the two fluid connections 14a, 14b.

Preferably, the enveloping body 7 contains an external tube 16 that extends between the two connection elements 13a, 13b. Expediently, said tube has a circular-cylindrical outer circumferential area 17. The outer circumferential area 17 is, in particular, configured as smooth, such that it can advantageously function as a slide and/or guide surface for an actuation element 18 that will be described in further detail below.

The external tube 16 is connected to the respectively allocated close-off element 13a, 3b by way of the two axial end sections 22a, 22b that are diametrically opposed relative to each other. Expediently, the fastening connection is without screws and without any additional fastening elements and achieved solely by a plastic reshaping of the mentioned end sections 22a, 22b. Each close-off element 13a, 13b plunges somewhat coaxially into the external tube 16 and expediently includes, in the area of the outer circumference thereof, a concentric, radially opened ring groove 23, and the allocated end section 22, 22b of the external tube 16 is radially pressed into said ring groove by a force-type or form-type closure, for example by means of rolling.

Correspondingly, together, the external tube 16 and the connection elements 13a, 13b constitute one rigid unit.

The enveloping body 7 is expediently configured in multiple parts. By way of an example, it has, in addition to the external tube 16, a support body 24 that is coaxially disposed between the external tube 16 and the valve element 3, and which is configured in a sleeve-like manner and includes on the inner circumference thereof a support surface 25 that encloses the valve element 3, and the contour of which corresponds to the outer contour valve element 3, when the valve element is in the maximally open position. The support surface 25 prevents any radial inflation of the rubber-elastic valve element 3.

The support body 24 expediently comprises two individual shell-like support elements 24a, 24b, respectively, that are placed, coming from two diametrically opposed sides, radially from the outside against the valve element 3 and that complement each other to form a sleeve-like support body 24. The support elements 24a, 24b are held together by the external tube 16 that is placed thereupon. The assembly is simplified because the support body 24 is made up of multiple parts.

Deviating from the embodiment, however, the enveloping body 7 can also be configured in one piece.

The previously mentioned actuating element 18 is guided in a slidable manner on the outer circumference 17 of the enveloping body 7. Expediently, the actuating element 18 is configured in a sleeve-like manner and disposed coaxially relative to the valve element 3. The axial length thereof is less than that of the external tube 16.

The actuating element 18 is able to carry out a rotational movement 26 in relation to the valve element 3, as indicated by the double arrow, in the circumferential direction thereof. The circumferential direction of the valve element 3 is the direction around the longitudinal axis 10. The longitudinal axis 10 constitutes the imagined axis of rotation for the rotational movement 26 of the actuating element 18, wherein the radial position of the actuating element 18 in relation to the valve element 3 is achieved by the interaction with the outer circumferential surface 17 of the enveloping body 7 that is enclosed by the actuating element 18.

The actuating element 18 is, furthermore, able to execute an axial displacement movement, as indicated by a double arrow 27, which means a translational movement in the direction of the axis of the longitudinal axis 10. Unless indicated to the contrary in the individual case, the term "axial" refers to the direction of the axis of the longitudinal axis 10.

However, the actuating element 18 is not feely movable to execute the rotational movement 26 and the axial displacement movement 27. Rather, first and second guide means 28a, 28b are provided that cooperate with each other and that ensure that the actuating element 18 is only able to execute an actuation movement 32, as indicated by a double arrow, which is a fixedly prescribed combination of the rotational movement 26 and the displacement movement 27, wherein the rotational movement 26 and the displacement movement 27 are superimposed at least in part during the execution of the actuating movement 32.

To control the flow-through of a flow medium through the channel of the valve element 5, the pinch valve 1 expediently includes two plungers 33a, 33b, which are referred to as first and second plungers 33a, 33b for an easier understanding, and which are disposed, respectively, in the radial intermediate space between the valve element 3 and the actuating element 18. Although, as a matter of principle, it is possible to provide a different number of plungers 33a, 33b,—the pinch valve 1 could include only one such plunger or more than two plungers—, using a dual arrangement of plungers 33a, 33b has proved especially expedient.

Each plunger 33a, 33b intersperses, in terms of the configuration thereof, a correspondingly adjusted radial passage 34a, 34b of the enveloping body 7 in the radial direction. Each plunger 33a, 33b therein is displaceable in relation to the enveloping body 7 at a right angle, and particularly in a radial direction, in relation to the longitudinal axis 10. The displacement movement of the plungers 33a, 33b, that is thus possible, will be referred to below as the operating movement 35. In particular, this is a linear movement.

In the context of the operating movement 35, each of the plungers 33a, 33b can optionally be moved radially to the inside in the direction toward the valve element 35 or in the related opposite direction radially toward the outside.

The operating movements 35 can be generated by the actuating element 18, when said actuating element executes an actuation movement 32. In other words, the actuating element 18 functions as a drive element for the plungers 33a, 33b. The actuating element 18 cooperates, in particular, with the two plungers 33a, 33b in such a manner that these two plungers 33a, 33b execute their operating movements 35 synchronously, respectively, either simultaneously radially toward the inside or simultaneously radially toward the outside.

Figure 4:
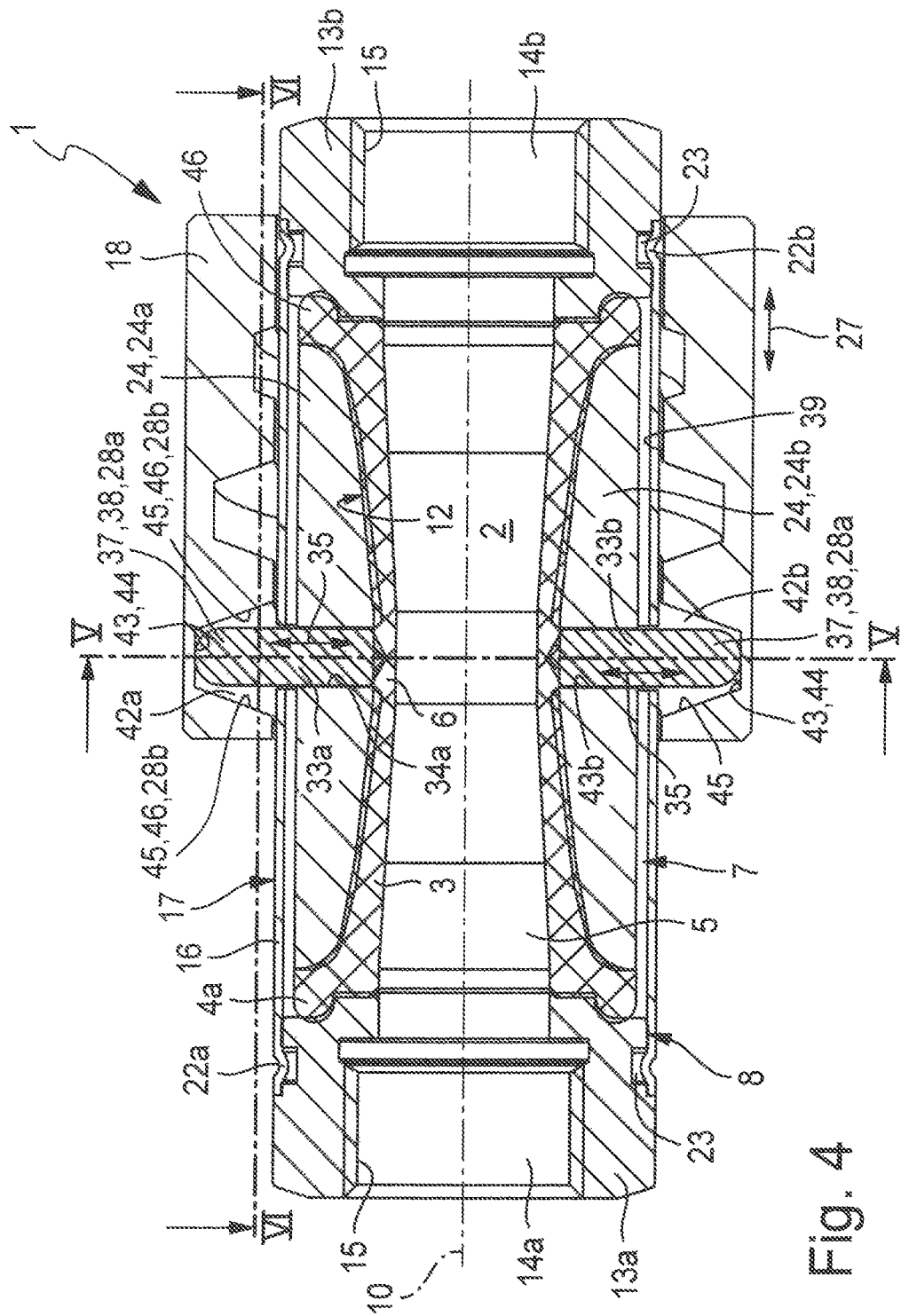
FIG. 4 depicts a view of a longitudinal section of the pinch valve in the maximum open position, along a sectional line IV-IV from FIG. 2.
Figure 6:
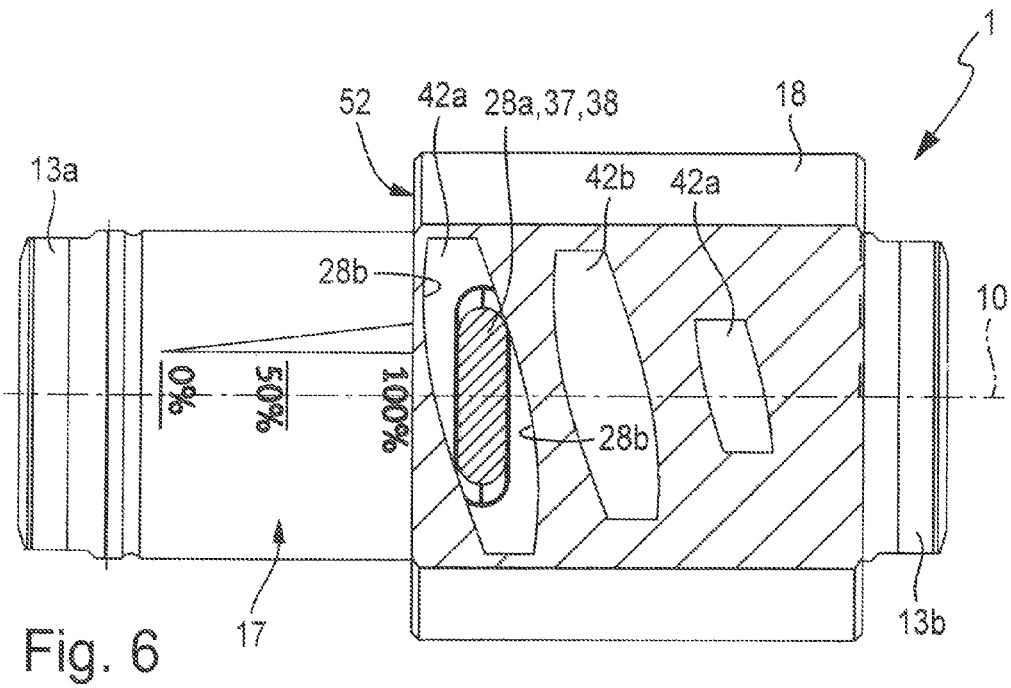
FIG. 6 depicts an eccentric longitudinal section through the pinch valve in the maximum open position, along sectional line VI-VI from FIG. 4.
Figure 11:
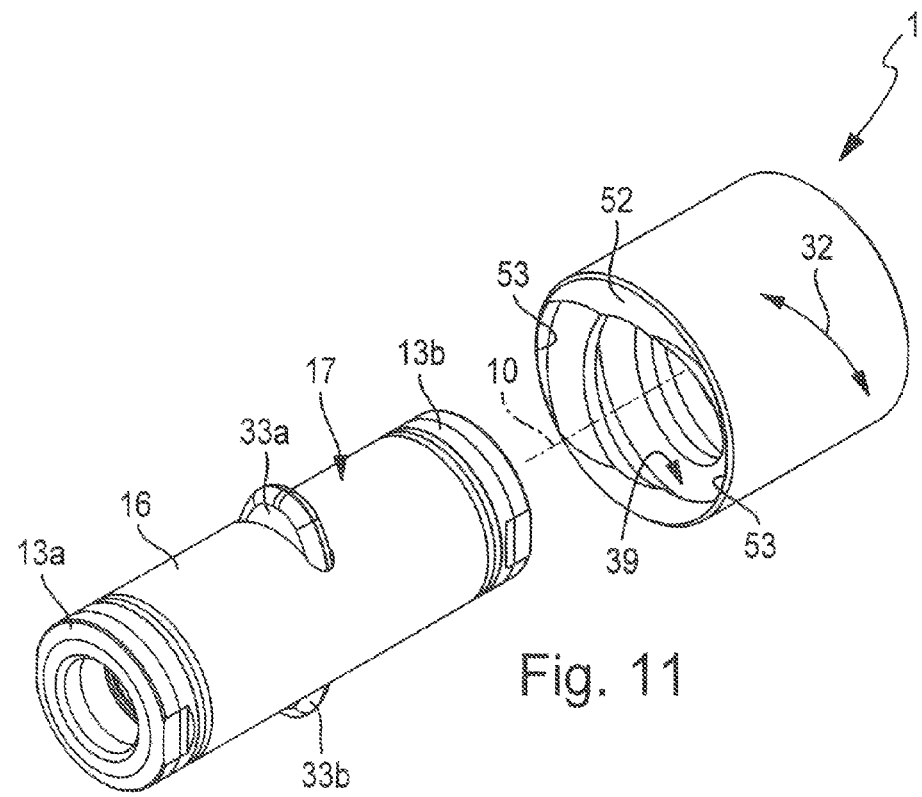
FIG. 11 depicts the pinch valve in a state in which the actuating element has been removed.
Figure 7:
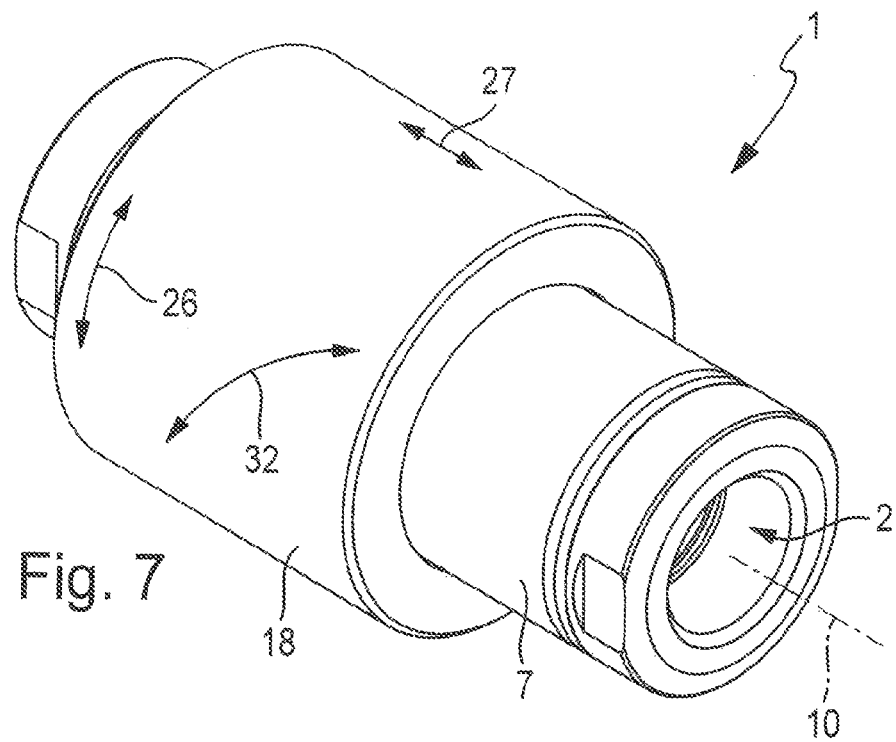
FIG. 7 depicts an exterior perspective view of the pinch valve in the closed position, completely sealing the valve element.
Figure 8:
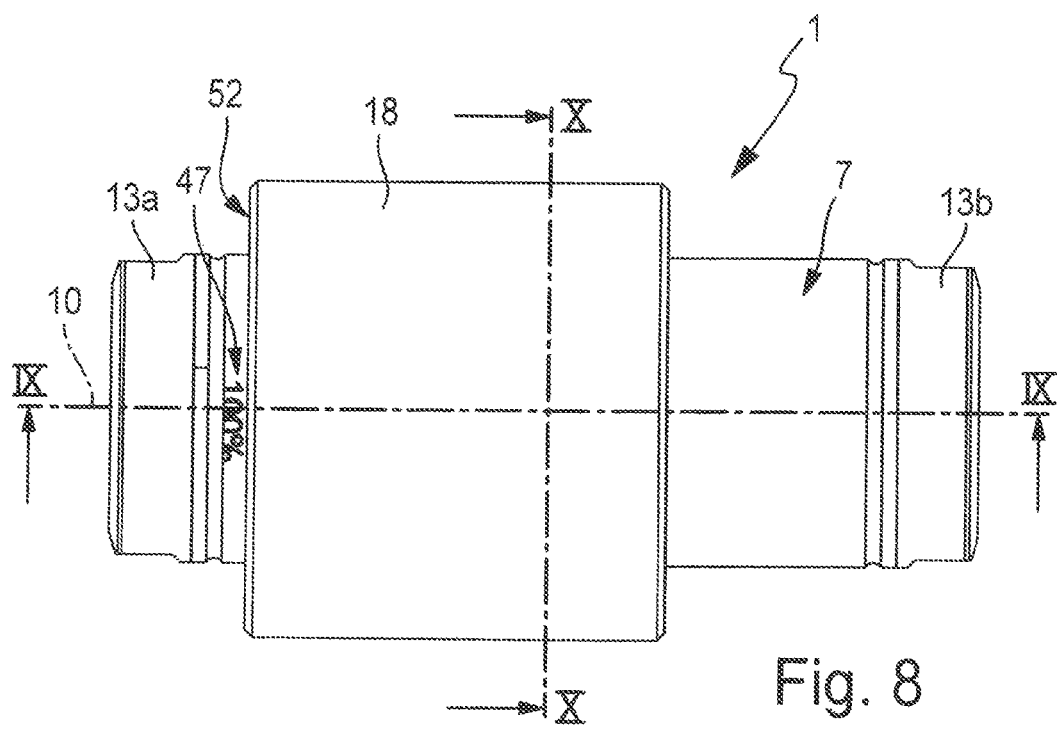
FIG. 8 depicts the pinch valve in the closed position from FIG. 7 in a side view.

Each plunger 33a, 33b can take an end position that is maximally radially displaced to the outside, as illustrated in FIGS. 4 und 5. The plungers 33a, 33b rest therein without preload or only with a minimal preload on the control area 6 on the outer circumference 12 of the valve element 3. Therefore, the valve element is in the maximum open position thereof.

The two plungers 33a, 33b can, moreover, assume a maximum inner end position, which is a maximally displaced position toward the inside, where they clamp the valve element 3 between each other creating an elastic deformation in such a manner that the closed position of the valve element 3 is achieved, in which the passage through the channel of the valve element 5 is interrupted.

Figure 9:
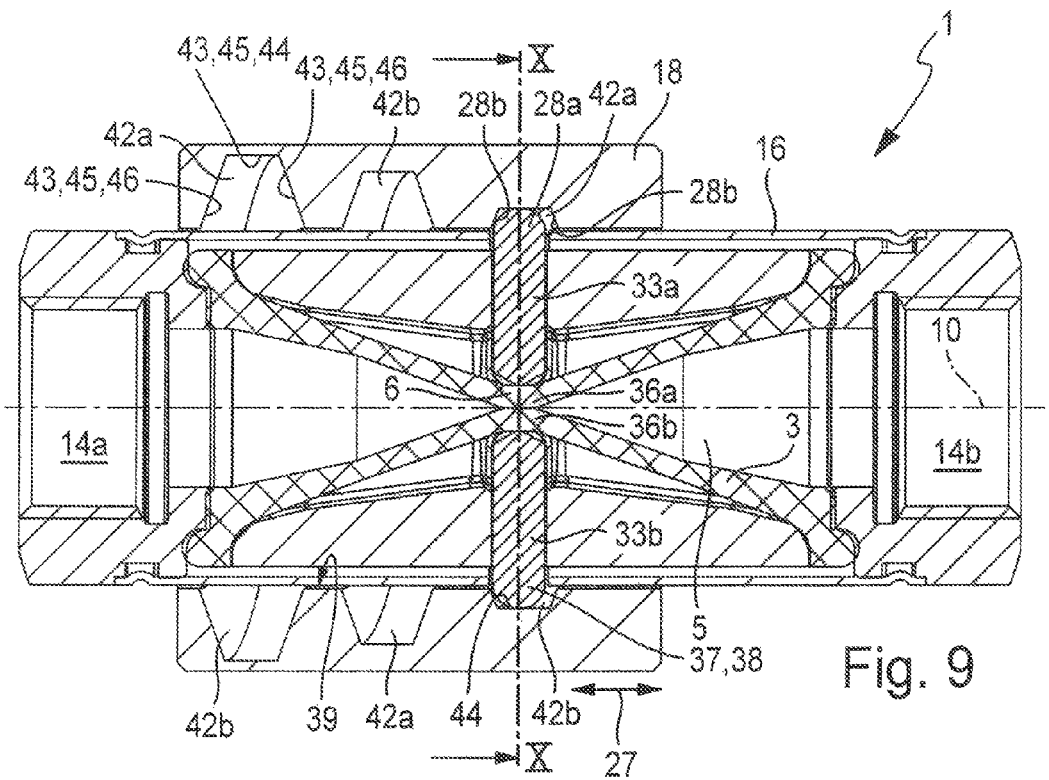
FIG. 9 depicts the pinch valve in the closed position, in a longitudinal section along the sectional line IX-IX from FIG. 8.
Figure 10:
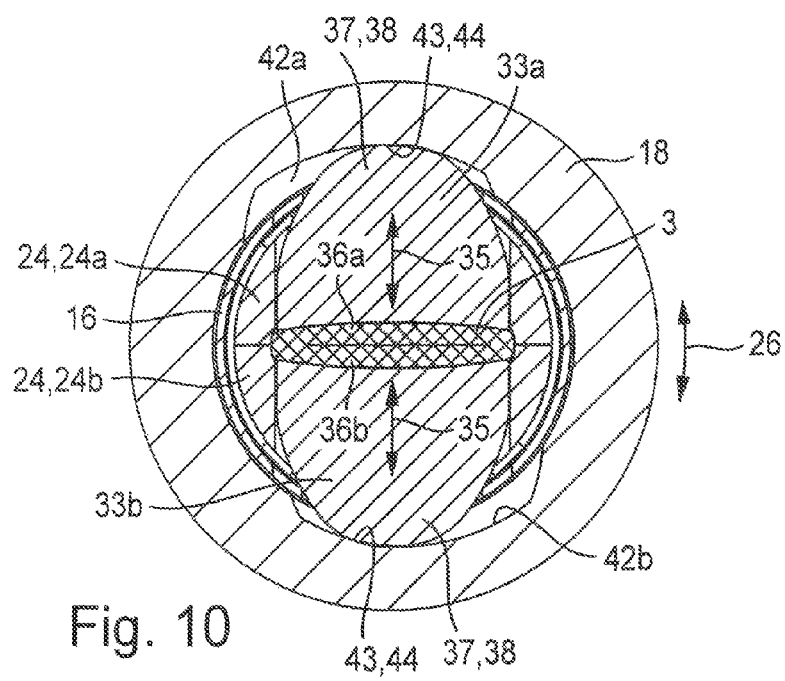
FIG. 10 depicts the pinch valve in the closed position along a sectional line X-X from FIGS. 8 and 9.

The closed position of the valve element 3 that can be discerned based on FIGS. 9 und 10 is demonstrated by way of an example in that the plungers 33a, 33b cause the, in particular, wall sections 36a, 36b, which are disposed as diametrically opposed relative to each other, of the wall that encloses the channel of the valve element 3 to be pinched until they make contact with each other. The wall sections 36a, 36b come to rest against each other in a sealing fashion.

The two plungers 33a, 33b are expediently placed in the area of circumferential areas of the valve element 3 that are diametrically opposed in relation to each other. Therefore, in relation to the longitudinal axis 10, they are disposed diametrically opposite each other. The operating movements 35 thereof are expediently oriented parallel in relation to each other. Both operating movements 35 therein expediently extend in a radial direction relative to the longitudinal axis 10.

While, by way of an example, the plungers 33a, 33b are configured in one piece, as a matter of principle, they can also be structured in multiple parts.

Each plunger 33a, 33b, independently of the radial position thereof that it takes with regard to the enveloping body 7, protrudes somewhat radially toward the outside extending beyond the outer circumferential area 17. In other words, each plunger 33a, 33b has an outer end section 37 that is disposed opposite in relation to the valve element 3 and outside of the enveloping body 7. Preferably, it is this end section 37 that constitutes an actuating section 38 that cooperates with the actuating element 18 to cause the operating movement 35.

The preferably sleeve-like actuating element 18 includes at the radial inner side 39 thereof, which is directed toward the valve element—that are constituted, in an exemplary manner of the inner circumference of the actuating element 18—a number of non-linear grooves 42a, 42b that correspond to the number of available plungers 33a, 33b. Corresponding to the dual number of plungers 33a, 33b, which are available in the embodiment, the actuating element 18 has at the inner side 39 thereof or at the internal circumference thereof, respectively two grooves 42a, 42b, which will be referred to below as first groove 42a and second groove 42b.

The two grooves 42a, 42b are open on the inner side that is directed toward the valve element 3. Preferably, they have at least partially, and particularly over the entire length thereof, a helical or spiral-like longitudinal profile.

Expediently, the two grooves 42a, 42b are configured in the manner of a multiple-start thread, wherein they are disposed at the same axial height between each other in relation to the axial direction of the actuating element 18, and they are only offset relative to each other in relation to the circumferential direction of the valve element 3. Said circumferential offset amounts, in particular, to 180°. In relation to each other, the available grooves 42a, 42b expediently have identical longitudinal profiles.

Each plunger 33a, 33b extends by the actuating section 38 thereof in one of the two grooves 42a, 42b, from radially inside. Correspondingly, the plungers 33a, 33b engage in different grooves 42a, 42b.

Expediently, the two plungers 33a, 33b are disposed at the same height in the axial direction of the longitudinal axis 10. Preferably, they also have a linear longitudinal profile transversely in relation to the longitudinal axis 10. Correspondingly, they engage by the end sections 37 thereof, that constitute the actuating sections 38, at the same axial height as the actuating element 18 in different grooves 42a, 42b.

Each groove 42a, 42b is delimited by a delimiting surface 45 that defines the contour of the cross-section of the related groove 42a, 42b. By way of an example, the delimiting surface 45 comprises per groove 42a, 42b a base surface 43 that is disposed opposite the groove opening and two lateral groove flanks 46 that are directed toward each other in the axial direction of the longitudinal axis 10.

In the embodiment, the cross-section of the groves 42a, 42b is advantageously configured in a trapezoidal shape, such that the base surface 43 as well as the two groove flanks 46 both have a straight cross-sectional contour. Expediently, the groove flanks 46 are, moreover, configured in such a manner that, starting from the base surface 43, they diverge toward the groove opening. Correspondingly, each groove 42a, 42b is tapered in the depth direction thereof.

Expediently, it is the base surface 43 of a respective groove 42a, 42b that constitutes the actuating surface 44, which collaborates with the allocated actuating section 38 in terms of a drive function and pressing there-against. Each plunger 33a, 33b supports itself by the actuating section 38 thereof, radially from the inside, on the base surface 43, and thus on the actuating surface 44 constituted thereof. It is clear, therefore that the operating position of each plunger 33a, 33b, meaning the position each plunger 33a, 33b can assume in the context of the operating movement 35, depends on which radial spacing exists between the instantaneously cooperating surface section of the actuating surface 44 and the longitudinal axis 10.

This previously mentioned circumstance is taken into consideration in the context of the present pinch valve in that each groove 42a, 42b includes over the longitudinal profile thereof a changing and, particularly, continually changing groove depth. As a consequence, the actuating surface 44 that is constituted of the base surface 43 also has a longitudinal profile with a changing radial spacing with regard to the longitudinal axis 10, and thereby also with regard to the valve element 3.

Due to the helical longitudinal profile of the grooves 42a, 42b, the actuating surface 44 also has a helical longitudinal profile, meaning a longitudinal profile that extends at least somewhat in the circumferential direction of the valve element 3 and that includes, in addition, an axial component that is superimposed relative to this circumferential direction and oriented in the axial direction of the longitudinal axis 10 of the valve element 3.

The guide means 28a, 28b, that were addressed previously, ensure that the actuating element 18 executes the previously mentioned actuating movement 26 when a torque is applied thereto, wherein at the actuating section 38 of each plunger 33a, 33b, one of the actuating surfaces 45, which extend in a spiral-like manner around the valve element 3, slides off. Due to the guide means 28a, 28b that cooperate with each other, the actuating element 18 advances in a screw-like manner in the direction of the axis of the longitudinal axis 10 in relation to the valve element 3. Simultaneously, the plungers 33a, 33b are gradually, and particularly continually, displaced toward the inside, while, simultaneously, the valve element 3 is pinched, because, at the actuating surfaces 38 thereof, one actuating surface 44 slides off respectively, and the radial spacing of which, that is taken up with regard to the longitudinal axis 10, changes over the length of the longitudinal profile.

Advantageously, the guide means 28a, 28b are constituted, on the one hand, of the actuating section 38 and, on the other hand, by the groove flanks 46 of a respective groove 42a, 42b. Correspondingly, each groove 42a, 42b and each actuating section 38 fulfills a dual function with regard to generating the adjustment force that is instrumental in causing the operating movement 35, on the one hand, and guiding of the actuating element 18 during the screwing process thereof, on the other hand. The engagement of the plungers 33*a*, 33*b* in the grooves 42*a*, 42*b* is comparable to a threaded-type engagement, wherein the plungers 33*a*, 33*b* ensure, based on the position thereof, which is unchangeable in the axial direction of the longitudinal axis 10, that the actuating movement 32 of the actuating element 18 results as a consequence of superimposing a rotational movement 26 and an axial displacement movement 27.

To avoid any jamming risk between the actuating section 38 and the actuating element 18, it is advantageous for the actuating section 38 to have a tapered outer contour in the area by which it engages in a groove 42*a*, 42*b*, viewed from the perspective of the plunger 33*a*, 33*b* being in the axial direction of the longitudinal axis 10. According to FIGS. 5 and 10, the end section can be rounded, in particular.

Looking at the structure of the actuating element 18, which results from the at least one groove 42*a*, 42*b*, the observer will notice that the grooves 42*a*, 42*b* define, by the protrusions that axially remain respectively there-between, the groove flanks 46 that serve for the guiding action; expediently, this is a tapered thread respectively.

Expediently, the axial incline of each spiral-like groove 42*a*, 42*b* is even. This allows, by the introduction of a torque in the actuating element 18, an even advancing movement, as well as an even actuation of the plungers 33*a*, 33*b*.

Moreover, it is advantageous for the degree of the changes in the spacing that occurs in the longitudinal direction of an actuating surface 44 with regard to the longitudinal axis 10 is such that, in each adjustment position of the actuating element 18, a self-inhibition is created. Correspondingly, the plungers 33*a*, 33*b* maintain each adjusted operating position even in such instances when no external actuating force is any longer applied to the actuating element 18.

The pinch valve in FIGS. 1 to 11 is especially configured for manual actuation. The manual actuation occurs by the manual introduction of a torque, which is oriented in the circumferential direction of the longitudinal axis 10, into the actuation element 18. For example, it is possible to grasp the actuating element the grip of a hand and comfortably introduce the desired actuating torque in this manner.

The respectively realized flow-through adjustment can be very easily visualized with a display scale 47 that is disposed on the outer circumferential surface 17 of the enveloping body 7 extending in the longitudinal direction of the valve element 3; and said display scale acts in conjunction with the actuation element 18 that is axially adjustable in the context of the actuation movement 26. Depending on the adjustment position of the actuation element 18, said actuation element covers up the axial display scale 47 to a more or less comprehensive axial degree, which can be utilized as an indicator for the instantaneously applicable flow-through adjustment.

For example, an axially oriented frontal surface 52 can be utilized with regard to the instantaneous axial position thereof as a reference edge, and wherein the relative position thereof in relation to the indicator scale 47 reflects the respective operating state.

An advantage of the embodied pinch valve 1 is the fact that the cross-section of flow that is provided by the valve element 3 can be changed and adjusted in a stepless manner. The instantaneously adjusted value signifying the amount of opening can be easily derived from the axial position of the actuating element 18 in relation to the enveloping body 7. Furthermore, there exists the advantageous possibility of selecting the longitudinal profile of the grooves 42*a*, 42*b* in such a manner that the angular rotation of the actuating element 18 during the execution of the actuating movement 26 and the related change of the cross-section of flow, that is defined by the valve element 3, constitute a linear function.

To avoid fouling of the cooperation area between the plungers 33*a*, 33*b* and the longitudinal grooves 42*a*, 42*b*, it is possible to provide the actuating element 18 in the area of the two frontal sides thereof with a seal in relation to the outer circumferential surface 17. For example, the actuating element 18 can be provided with a sealing ring at the corresponding locations, and said sealing ring rests, with the ability of being displaced by sliding, against the outer circumferential surface 17.

Expediently, the at least one groove 42*a*, 42*b* opens toward at least one axial frontal surface 52 of the actuating element 18. If a plurality of grooves 42*a*, 42*b* are present, all grooves 42*a*, 42*b* expediently open toward the same axial frontal surface 52. Expediently allocated to the axial frontal surface 52 is that end section of a respective groove 42*a*, 42*b* that has the greatest groove depth. Correspondingly, starting with the disassembled position as shown in FIG. 1, the actuating element 18 can be very easily placed on the enveloping body 7 and engaged in the actuating sections 38, such that it is, advanced by said axial frontal surface, pushed onto the enveloping body 7 and, by means of the subsequent rotation, screwed on to the actuating sections 38. The open end sections of the grooves 42*a*, 42*b* at the axial frontal surface 52 are hinted at in 53.

Figure 12:
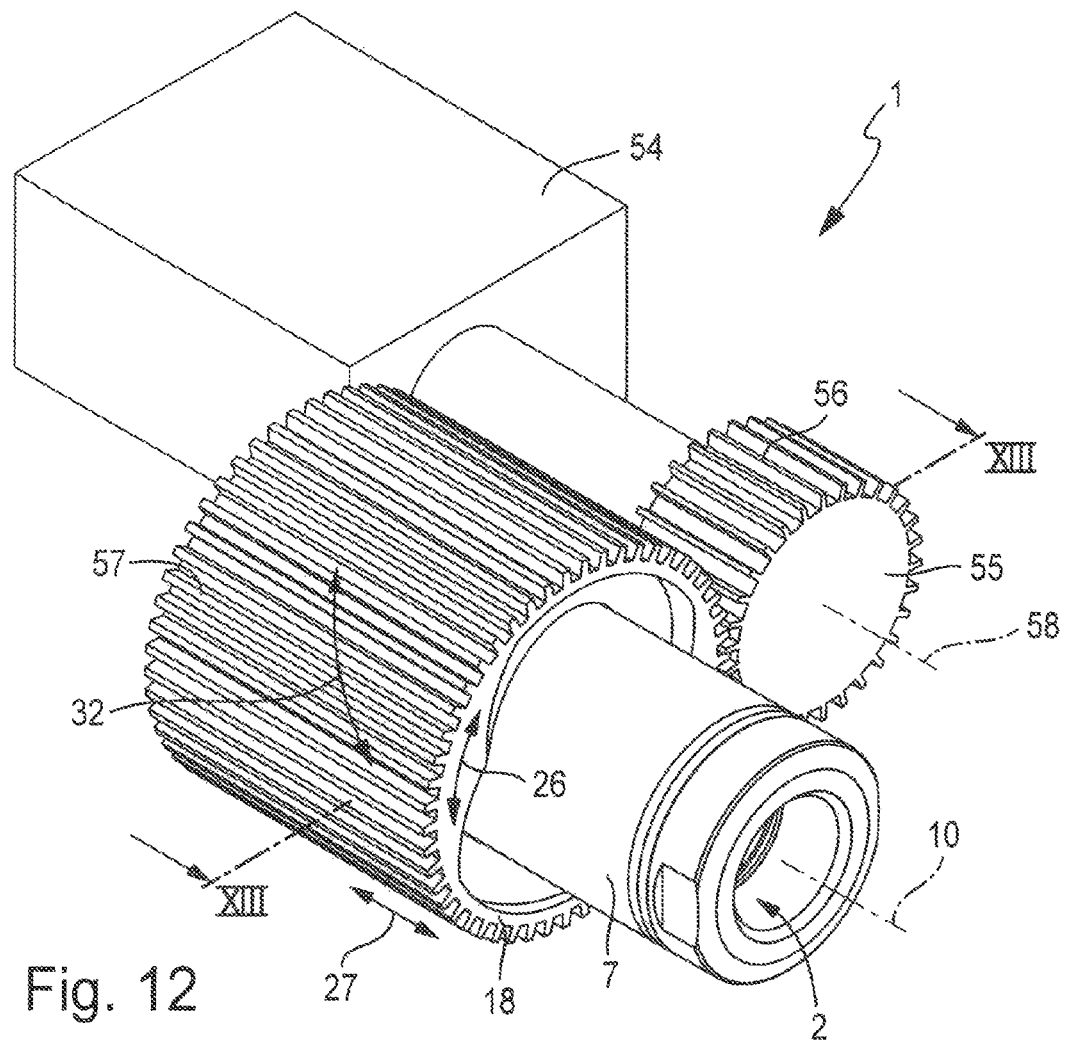
FIG. 12 depicts a further embodied example of the pinch valve having means for the machine-type, particularly motor-powered, actuation.
Figure 13:
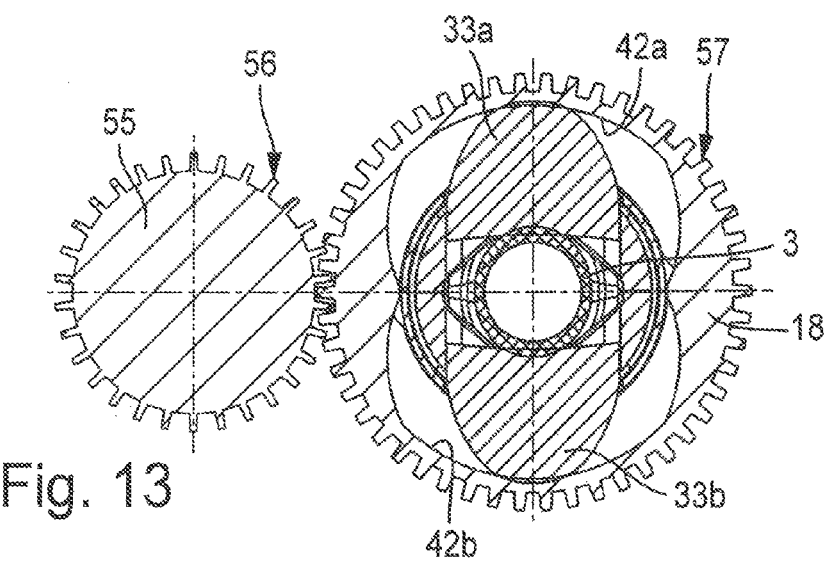
FIG. 13 depicts a cross-section of the arrangement from FIG. 12 along a sectional line XIII-XIII.

The embodiment that is shown in FIGS. 12 and 13 corresponds to the embodiment that is represented in FIGS. 1 to 11, except for the manner in which the actuating torque is introduced in the sleeve-like actuating element 18. The differences consist particularly in that the torque, which generates the actuating movement 32, is introduced in a machine-type fashion, particularly by way of a motor, into the actuating element 18.

The pinch valve 1 as represented in FIGS. 12 and 13 contains an electrical drive motor 54 the drive shaft of which is connected to a drive pinion, which includes an external toothing 56 that meshes with a ring gear 57 that is disposed around the outer circumference of the actuating element 18 that is radially opposite in relation to the valve element 3.

A rotation of the drive pinion 55 that is generated by the drive motor 54 thus causes, due to the meshing of the teeth, a rotational movement 26 of the actuating element 18, which has superimposed thereupon, due to the cooperation between the guide means 28*a*, 28*b*, a displacement movement 27, which results overall, as a consequence, in the actuation movement 32. The axial movability of the actuating element 18 can be easily ensured in that the drive pinion 55 is disposed in a parallel alignment in relation to the longitudinal axis 10 of the valve element 3 of the longitudinal axis 58 thereof, and the external toothing 56 as well as the ring gear 57 are both configured having straight teeth, such that the actuating element 18 is able to slide off the drive pinion 55 when executing the displacement movement 27.

The actuating force for generating the actuating movement 32 can also be generated in a machine-type fashion, for example by means of an electromagnetic drive unit or by a drive unit that is actuated by means of fluid force.

If a non-linear displacement behavior of the plungers 33*a*, 33*b* is desired, the actuating surface 44 can also be configured such that the distance thereof in relation to the valve element along the longitudinal direction thereof does not change continually, but that it changes, for example, with a changing incline. The axial incline of the spiral-like actuation surface 44 with regard to the longitudinal axis 10 can also be uneven. In addition, the configuration of the actuating surface 44 is not subject to any special restrictions, such that, in particular, there exists also the possibility to align one or a plurality of the longitudinal sections thereof in such a manner that they extend exclusively in the circumferential direction of the valve element 3 or exclusively in the longitudinal direction of the valve element 3.

The invention claimed is:

1. A pinch valve comprising:
a hose-like valve element with a longitudinal axis;
an actuating element that is disposed in the area of the outer circumference of the valve element and which is rotatable relative to the valve element in the circumferential direction thereof while executing an actuating movement; and
at least one plunger which is disposed between the valve element and the actuating element for pinching the valve element, the plunger being movable transversely relative to the longitudinal axis of the valve element while executing an operating movement toward the inside in the direction to the valve element or opposite thereto toward the outside,
wherein the actuating element includes a helical groove longitudinally formed in an inner surface thereof, the groove having a changing depth in the direction of the longitudinal axis and further defining at least one actuating surface directed toward the valve element and serving for a pressing application of force of the at least one plunger directed toward the inside, the at least one actuating surface sliding along the at least one plunger when executing the actuation movement and having a longitudinal profile extending at least in part in the circumferential direction of the valve element with a changing spacing in relation to the valve element, wherein the actuating movement of the actuating element is a combination of a rotational movement and of an axial displacement movement.

2. The pinch valve according to claim 1, wherein the at least one actuating surface comprises a delimiting surface defined by a base area of the helical groove that is disposed on the inner side of the actuating element into which an actuating section of the at least one plunger protrudes, wherein the actuating section is formed by a tapered end section of the plunger opposite the valve element.

3. The pinch valve according to claim 2, wherein the depth change of the groove is continual.

4. The pinch valve according to claim 2, wherein the at least one actuating surface further comprises groove flanks that are spaced opposite each other at a distance and between which the plunger plunges, the groove flanks, together with the delimiting surface providing a guide between the plunger and the actuating element.

5. The pinch valve according to claim 1, wherein a plurality of individual plungers are distributed in the circumferential direction around the valve element serving for pinching the valve element.

6. The pinch valve according to claim 5, wherein two plungers are disposed in a diametrically opposed fashion in the area of the outer circumference of the valve element, the operating movements of which are radially oriented in relation to the longitudinal axis of the valve element.

7. The pinch valve according to claim 5, wherein a plurality of actuating surfaces is disposed on the actuating element, wherein at least two plungers cooperate with different actuating surfaces.

8. The pinch valve according to claim 7, wherein the plurality of actuating surfaces is disposed in the circumferential direction of the valve element in an offset manner relative to each other on the actuating element, wherein the offset is 180°.

9. The pinch valve according to claim 7, wherein the plurality of actuating surfaces have an identical longitudinal profile among each other.

10. The pinch valve according to claim 1, wherein, on the inner side of the actuating element, there is disposed a plurality of grooves in the manner of a multiple-start thread, and one of a plurality of the plungers, that are distributed over the outer circumference of the valve element, engages therein respectively, wherein the grooves serve for both the pressing application of force and at the same time as a guide for the plurality of plungers, respectively.

11. The pinch valve according to claim 1, wherein the actuating element is configured as sleeve-like and is coaxially disposed relative to the valve element.

12. The pinch valve according to claim 1, wherein the pinch valve includes a rigid enveloping body that coaxially encloses the valve element, and the actuating element is disposed as rotatably and axially displaceable on the outer circumferential area of the enveloping body, and a wall of the enveloping body thereof is displaceably interspersed by the at least one plunger.

13. The pinch valve according to claim 12, wherein an indicator scale is disposed on the outer circumference of the enveloping body that extends in the longitudinal direction of the valve element that is travelled over by the actuating element at axially different distances depending on the adjustment position of the actuating element.

14. The pinch valve according to claim 1, wherein the degree of the spacing changes between the actuating surface and the valve element that is present in the longitudinal direction is such that a self-inhibition of the actuating element is generated in each adjustment position.

15. The pinch valve according to claim 1, wherein the actuation element is configured for the manual and/or machine-type introduction of an actuating force that generates the actuating movement, wherein, for the machine-type introduction of the actuating force, the pinch valve contains an electric drive motor that is coupled to the actuating element.

16. A pinch valve comprising:
a hose-like valve element with a longitudinal axis;
an actuating element that is disposed in the area of the outer circumference of the valve element and which is rotatable relative to the valve element in the circumferential direction thereof while executing an actuating movement; and
a plurality of plungers distributed over the outer circumference of the valve element between the valve element and the actuating element for pinching the valve element, the plunger being movable transversely relative to the longitudinal axis of the valve element while executing an operating movement toward the inside in the direction to the valve element or opposite thereto toward the outside,
wherein the actuating element includes a plurality of helical grooves longitudinally formed in an inner surface thereof, each groove extending in the direction of the longitudinal axis and further defining at least one actuating surface directed toward the valve element and serving for a pressing application of force of a respective plunger directed toward the inside, the at least one actuating surface of each groove sliding along the respective plunger when executing the actuation movement and having a longitudinal profile extending at least in part in the circumferential direction of the valve element with a changing spacing in relation to the valve element, wherein the actuating movement of the actuating element is a combination of a rotational movement and of an axial displacement movement, and
wherein the plurality of grooves form a multiple-start thread for pressing the application of force on the plurality of plungers and, at the same time, for guiding the plurality of plungers.

* * * * *